(12) United States Patent
Asti et al.

(10) Patent No.: US 10,871,109 B2
(45) Date of Patent: Dec. 22, 2020

(54) OPERATION METHOD FOR IMPROVING PARTIAL LOAD EFFICIENCY IN A GAS TURBINE AND GAS TURBINE WITH IMPROVED PARTIAL LOAD EFFICIENCY

(71) Applicant: Nuovo Pignone Tecnologie Srl, Florence (IT)

(72) Inventors: Antonio Asti, Florence (IT); Luciano Mei, Florence (IT); Riccardo Carta, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 15 days.

(21) Appl. No.: 15/549,802

(22) PCT Filed: Feb. 10, 2016

(86) PCT No.: PCT/EP2016/052848
§ 371 (c)(1),
(2) Date: Aug. 9, 2017

(87) PCT Pub. No.: WO2016/128479
PCT Pub. Date: Aug. 18, 2016

(65) Prior Publication Data
US 2018/0030903 A1 Feb. 1, 2018

(30) Foreign Application Priority Data

Feb. 12, 2015 (IT) .............................. CO2015A0002

(51) Int. Cl.
*F02C 9/00* (2006.01)
*F02C 9/22* (2006.01)
(Continued)

(52) U.S. Cl.
CPC .................. *F02C 9/22* (2013.01); *F02C 9/18* (2013.01); *F02C 9/52* (2013.01); *F02C 9/54* (2013.01); *F05D 2270/3061* (2013.01)

(58) Field of Classification Search
CPC ...... F02C 9/22; F02C 9/18; F02C 9/52; F02C 9/54; F02C 9/34; F02C 7/228;
(Continued)

(56) References Cited

U.S. PATENT DOCUMENTS

| 4,539,810 A | * | 9/1985 | Watanabe | ................. F02C 3/10 60/39.25 |
| 4,683,715 A | * | 8/1987 | Iizuka | ....................... F02C 7/26 60/39.41 |

(Continued)

FOREIGN PATENT DOCUMENTS

| EP | 2 383 452 A1 | 11/2011 |
| EP | 2835516 A1 | 2/2015 |

(Continued)

OTHER PUBLICATIONS

NASA, Turbine Thermodynamics, Feb. 3, 2012 (Year: 2012).*

(Continued)

*Primary Examiner* — Todd E Manahan
*Assistant Examiner* — Edwin Kang
(74) *Attorney, Agent, or Firm* — Baker Hughes Patent Org.

(57) ABSTRACT

A method for improving partial load efficiency in a gas turbine engine including a compressor, burners, a high pressure turbine and a low pressure turbine; including the step of operating the gas turbine engine by regulating at least: air mass flow rate and flame temperature; regulation is carried out by controlling at least: the air mass flow rate supplied to the combustion chamber from the compressor, and the number of operating burners, and the change in (Continued)

enthalpy drop between the high and low pressure turbine to control the air mass flow rate.

6 Claims, 2 Drawing Sheets

(51) Int. Cl.
    *F02C 9/52*     (2006.01)
    *F02C 9/54*     (2006.01)
    *F02C 9/18*     (2006.01)

(58) Field of Classification Search
    CPC .......... F05D 2270/31; F05D 2270/331; F05D 2270/3061; F23R 3/346
    See application file for complete search history.

(56) References Cited

U.S. PATENT DOCUMENTS

| | | | |
|---|---|---|---|
| 4,766,721 A | | 8/1988 | Iizuka et al. |
| 5,996,347 A | * | 12/1999 | Nagae ............ F02B 37/18 60/602 |
| 2006/0021354 A1 | * | 2/2006 | Mowill ............ F02C 9/18 60/776 |
| 2007/0074516 A1 | * | 4/2007 | Peck ............ F02C 9/18 60/772 |
| 2007/0227156 A1 | * | 10/2007 | Saito ............ F02C 3/14 60/772 |
| 2009/0158702 A1 | | 6/2009 | Tonno et al. |
| 2011/0270447 A1 | | 11/2011 | Allegorico et al. |
| 2015/0040573 A1 | | 2/2015 | Ferreira-Providakis et al. |
| 2016/0348690 A1 | | 12/2016 | Larson et al. |

FOREIGN PATENT DOCUMENTS

| | | |
|---|---|---|
| JP | S5910742 A | 1/1984 |
| JP | S62175524 A | 8/1987 |
| JP | 2004093076 A | 3/2004 |
| JP | 2009150391 A | 7/2009 |
| JP | 2011236895 A | 11/2011 |

OTHER PUBLICATIONS

Search Report and Written Opinion issued in connection with corresponding IT Application No. CO2015A000002 dated Oct. 16, 2015.

International Search Report and Written Opinion issued in connection with corresponding WO Application No. PCT/EP2016/052848 dated Apr. 29, 2016.

* cited by examiner

OPERATION METHOD FOR IMPROVING PARTIAL LOAD EFFICIENCY IN A GAS TURBINE AND GAS TURBINE WITH IMPROVED PARTIAL LOAD EFFICIENCY

TECHNICAL FIELD

Embodiments of the subject matter disclosed herein correspond to methods for improving partial load efficiency in a gas turbine engine (often referred to simply as "gas turbine") and gas turbine engines having an improved partial load efficiency.

BACKGROUND OF THE INVENTION

In the last years it has became more and more relevant controlling gas turbine operation obtaining high efficiency and/or low emissions at part load.

In such operative condition known gas turbine shows relatively low efficiency and/or high emissions, particularly NOx emissions.

When low-emissions premixed combustors are used, the reaction temperature must be kept as close as possible to the design value: in order to do this, it is necessary to develop some kind of control of the airflow that enters the combustion chamber.

Solutions for controlling part load operation of a gas turbine are known.

One known solution is to control, during the gas turbine operation, two degrees of freedom (in the part load operating range of the turbine); particularly it is known to provide a control for the compressor bleed and for the combustor staging.

Briefly, the "bleed" is a valve, usually located at the compressor discharge, that expels a fraction of the compressed air upstream the combustion chamber. This system dissipates part of the work spent in the compression.

On its turn, controlling the combustor staging implies to selectively turn off some of the burners, in order to let the active ones run at a stable fuel/air ratio. When performed at high power level, this approach causes thermal distortions on hot gas path components.

BRIEF DESCRIPTION OF THE INVENTION

Therefore there is a general need for a method for improving partial load efficiency in a gas turbine and a turbine having an improved partial load efficiency.

An important idea is to provide the gas turbine engine operation at part load controlling the gas turbine engine with three degrees of freedom, namely controlling a bleed flow rate of fluid of the compressor (more upstream than the compressor discharge), to limit the loss of work, a combustor staging and a nozzle guide vanes (NGV) control.

In this way it is possible to achieve a great versatility in controlling the main gas turbine engine parameters so as to achieve high efficiency and/or low emissions at part load.

One embodiment of the subject matter disclosed herein correspond to a method for improving partial load efficiency in a gas turbine engine comprising a compressor, burners, an high pressure turbine and a low pressure turbine, wherein the method comprises the step of operating the gas turbine engine by regulating at least an air mass flow rate and the flame temperature.

Such parameters (air mass flow rate and the flame temperature) are regulated by controlling at least: an air mass flow rate supplied to the combustion chamber from the compressor, and the number of operating burners, and the change in enthalpy drop between the high and low pressure turbine to control the air mass flow rate.

Still more particularly, the step a comprises a bleed that extracts a fraction of the flow rate of fluid of the compressor at a compressor stage more upstream of the discharge, to limit the loss of work, in which the bleed flow rate supplied to the combustion chamber is modified, and/or the step b comprises an annular combustor staging, in which the number of operating burners is modified, and/or the step c comprises a nozzle guide vane (NGV) control, in which the change in enthalpy drop between the high and low pressure turbine is modified, allowing for air mass flow rate regulation.

In other words, the method for improving partial load efficiency in a gas turbine engine provides for controlling, at part load, two degrees of freedom: a bleed flow rate of fluid of the compressor (ASV), in which the bleed flow rate supplied to the combustion chamber is modified, and an annular combustor staging, in which the number of operating burners is modified; wherein the method further comprises the step of controlling at least a third degree of freedom, said third degree of freedom being: a nozzle guide vanes (NGV) control, in which the change in enthalpy drop between the high and low pressure turbine is modified, allowing for air mass flow rate control.

Embodiments of the subject matter disclosed herein correspond to a gas turbine engine comprising a compressor, burners, an high pressure turbine and a low pressure turbine, said gas turbine engine further comprising a bleed flow piping of the compressor operatively connected to the high pressure turbine, an annular combustor staging device comprising said burners and a nozzle guide vane (NGV) control device.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
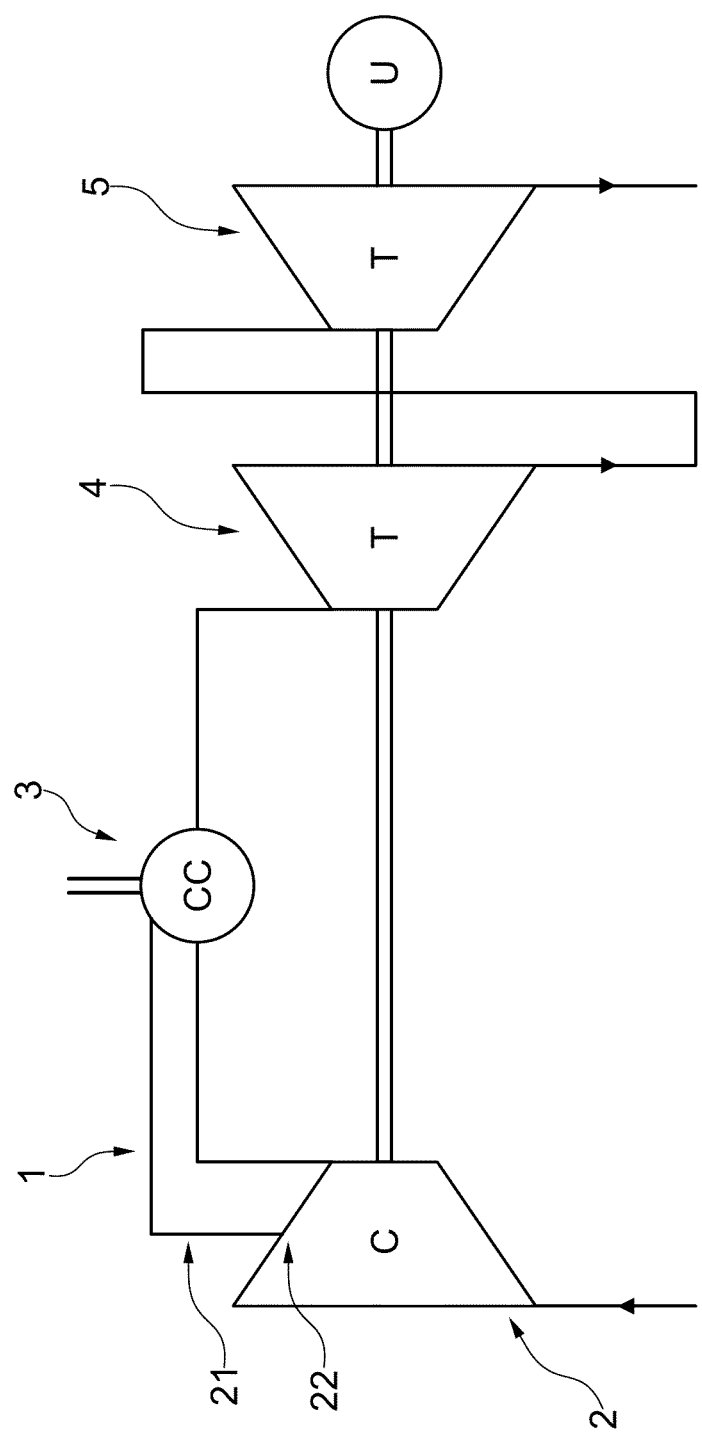
FIG. 2 shows a simplified gas turbine engine scheme.

One embodiment of a method for improving partial load efficiency herein described applies to a gas turbine engine as shown in FIG. 2.

As can be seen, the gas turbine engine 1, embodiment of the subject matter herein described, comprises a compressor 2, burners 3, an high pressure turbine 4 and a low pressure turbine 5, downstream of the first one.

According to the teaching herein given, the turbine engine 1 comprises also a bleed flow piping 21 of the compressor operatively connected to the high pressure turbine 4.

In an embodiment, the bleed flow piping 21 is operatively connected to an intermediate stage 22 of the compressor, different from the main outlet of the compressor 2, the bleed flow piping 21 is therefore operatively connected to a compressor stage more upstream of the discharge (main outlet) of the compressor itself.

In an embodiment, if said intermediate stage 22 of the compressor 2 comprises an anti surge valve ASV system, then the bleed flow piping 21 can be either a different piping from the anti surge valve ASV system, or can be the same piping of the anti surge valve ASV system.

In the latter case, said anti-surge valve system comprises also a regulation valve (not shown) that provides both for mass flow regulation (for the bleed flow piping 21) and for anti-surge purposes.

Furthermore, the gas turbine engine 1 also comprises an annular combustor staging device comprising said burners 3, of the type well known per se; briefly said device comprises an activation device for at least some of the, burners, said activation device being at least one valve per each burner.

Furthermore, the gas turbine engine 1 comprises also a nozzle guide vane (NGV) control device, known per se in the art; this device, briefly, comprises an actuator acting on a ring that on its turn moves pins coupled to the nozzle airfoils that open or closes the throat area of each nozzle thereby regulating enthalpy drop.

Figure 1:
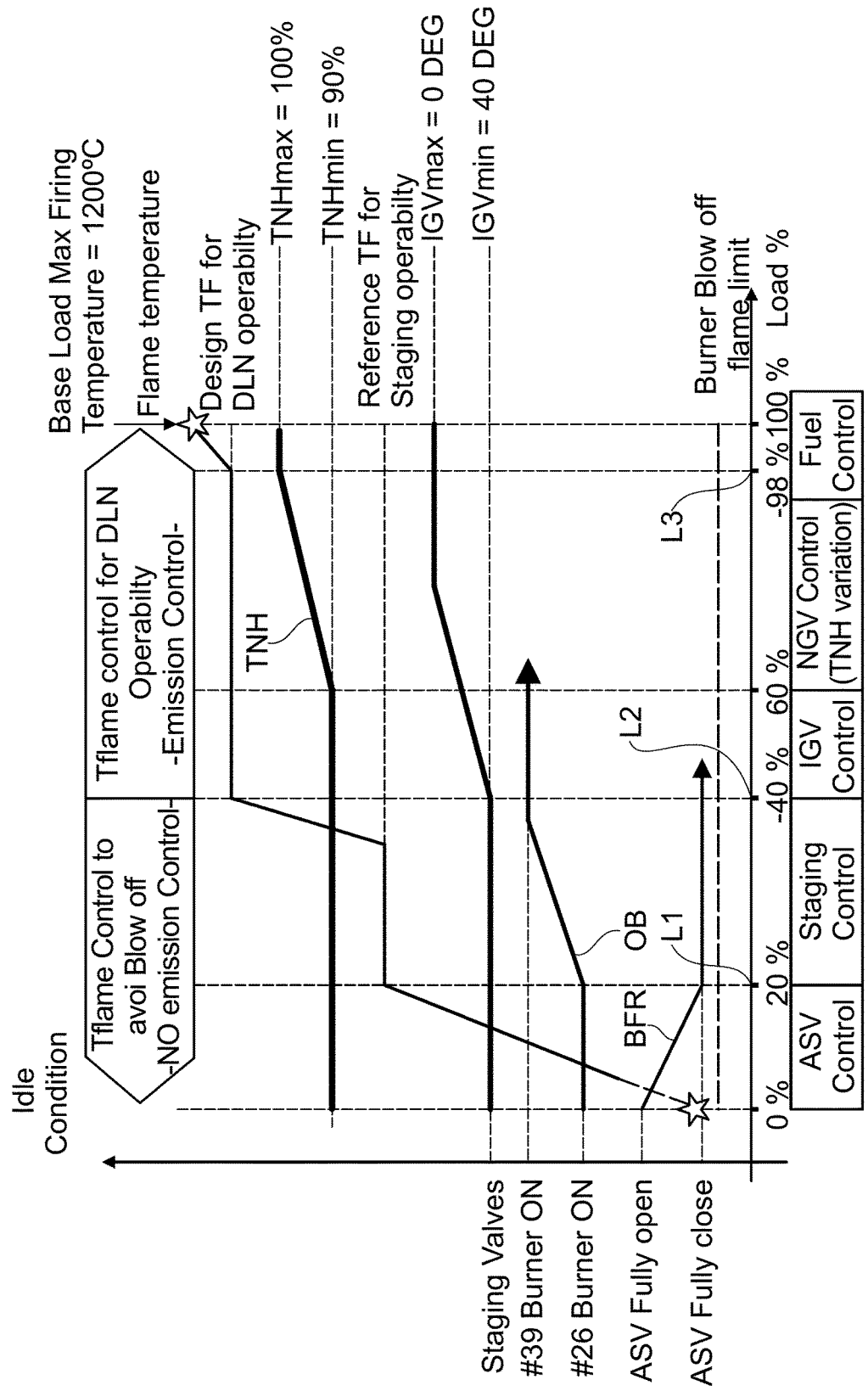
FIG. 1 shows a control diagram of an exemplary method herein disclosed.

With reference to FIG. 1, another embodiment of the subject matter is a method for improving partial load efficiency in a gas turbine engine 1 comprising a compressor 2, burners 3, an high pressure turbine 4 and a low pressure turbine 5, wherein the method comprises the step of operating the gas turbine engine by regulating at least: an air mass flow rate, flame temperature, by means of controlling at least: an air mass flow rate supplied to the combustion chamber from the compressor, the number of operating burners, the change in enthalpy drop between the high and low pressure turbine to control the air mass flow rate.

In an embodiment, the step a comprises a bleed that extracts a fraction of the flow rate of fluid of the compressor at a compressor stage more upstream of the discharge, to limit the loss of work, in which the bleed flow rate supplied to the combustion chamber is modified.

In an embodiment, the step b comprises an annular combustor staging, in which the number of operating burners is modified.

In an embodiment, the step c comprises a nozzle guide vane (NGV) control, in which the change in enthalpy drop between the high and low pressure turbine is modified, allowing for air mass flow rate regulation: the regulation of the enthalpy drop on high pressure turbine allows to modify the shaft speed and therefore the air mass flow rate.

Those controls are performed at different load of the turbine, as is depicted in FIG. 2.

According to an optional feature, at a lower load range, less than a first separating load value L1, the gas turbine engine is operated by controlling the bleed flow rate (ASV) so as to limits the loss of work, while at an intermediate load range, more than the first separating load value and less than a second separating load value L2, the gas turbine engine is operated by controlling the annular combustor staging so as to limit the thermal distortion of the hot gas path components, while at an upper load range, more than the second separating load value and less than a full (upper) operating load value L3, the gas turbine engine is operated by controlling the nozzle guide vane (NGV), so as to regulate the air mass flow rate.

For what concern the first L1, second L2 and upper L3 separating load values, in principle they are tunable and can be changed for operational purposes.

In an embodiment, with reference to FIG. 1, the first separating load value L1 is in a range comprised between 15% and 25%, still more particularly substantially equal to 20%, of a maximum turbine engine load and the second separating load value L2 is in an embodiment in a range comprised between 35% and 45%, still more particularly substantially equal to 40%, of a maximum turbine engine load.

The upper load range value L3 is in an embodiment substantially equal to 98%, of a maximum turbine engine load.

For what concern the control of the bleed flow rate of the compressor, it is provided at least bleeding—from the compressor—a flow rate of fluid, referenced as BFR in FIG. 1, decreasing, in an embodiment linearly decreasing, between an engine load between 0% (idle) and the first separating load value L1.

The bleed flow comes from an intermediate stage of the compressor, different from the main outlet of the compressor, in an embodiment from an intermediate stage of the compressor comprising an anti surge valve system ASV, as above described; to this extent in FIG. 1 that control is indicated ad "ASV control".

For what concerns the control of the annular combustor staging, it is provided at least for augmenting, and in an embodiment linearly augmenting, a number of operating burners, referenced as OB in FIG. 1, from a minimum number of operating burners at the first separating load value to a maximum number of operating burners at the second separating load value; to this extent in FIG. 1 that control is indicated ad "staging control".

In an embodiment, said maximum number of operating burners is equal to the maximum number of the burners in the turbine engine.

On its turn, the control of nozzle guide vane (NGV) provides at least for augmenting, in an embodiment, linearly augmenting the enthalpy drop in the high pressure turbine from a minimum value at the second separating load value to a maximum value at the upper load range; this regulation is in an embodiment linear as indicated in FIG. 1 and referenced with "TNH".

Such enthalpy drop is regulated for example by means of regulating a throat area of nozzles located upstream the power turbine, by means of rotating airfoils.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for improving partial load efficiency in a gas turbine engine comprising a compressor, operating burners, a high pressure turbine and a low pressure turbine, the method comprising:
operating the gas turbine engine by regulating at least:
an air mass flow rate, and
a flame temperature,
controlling at least:
the air mass flow rate supplied to a combustion chamber from the compressor;
a number of the operating burners; and
a change in an enthalpy drop between the high and low pressure turbine to control the air mass flow rate;
wherein
the air mass flow rate supplied to the combustion chamber from the compressor comprises a bleed that extracts a fraction of the air mass flow rate of the compressor at a compressor stage more upstream of a discharge, to limit a loss of work, in which a bleed flow rate supplied to the combustion chamber is modified, and
the number of the operating burners comprises an annular combustor staging, in which the number of operating burners is modified, and
the change in the enthalpy drop between the high and low pressure turbine to control the air mass flow rate comprises a nozzle guide vane control, in which the change in the enthalpy drop between the high and low pressure turbine is modified, allowing for regulation of the air mass flow rate, and
at a lower load range, less than a first separating load value, operating the gas turbine engine by only controlling the bleed flow rate so as to limit the loss of work,
at an intermediate load range, more than the first separating load value and less than a second separating load value, operating the gas turbine engine by only controlling the annular combustor staging so as to limit a thermal distortion of hot gas path components,
at an upper load range, more than the second separating load value and less than a full operating load value, operating the gas turbine engine by only controlling a plurality of nozzle guide vanes, so as to regulate the air mass flow rate.

2. The method of claim 1, wherein
the first separating load value is tunable, in a range comprised between 15% and 25% of a maximum turbine engine load, and/or
the second separating load value is tunable, preferably in a range comprised between 35% and 45% of the maximum turbine engine load, and/or
the upper load range is tunable, substantially equal to 98%, of the maximum turbine engine load.

3. The method of claim 1, wherein a control of the bleed flow rate of the compressor decreases between 0% (idle) and the first separating load value.

4. The method of claim 1, wherein the annular combustor staging provides at least for augmenting the number of the operating burners from a minimum number of the operating burners at the first separating load value to a maximum number of the operating burners at the second separating load value, the maximum number of the operating burners being equal to the maximum number of the operating burners in the turbine engine.

5. The method of claim 1, wherein controlling the plurality of nozzle guide vanes provides at least for augmenting the enthalpy drop in the high pressure turbine from a minimum value at the second separating load value to a maximum value at the upper load range, the enthalpy drop being regulated by regulating a throat area of nozzles located upstream the low pressure turbine, by rotating airfoils.

6. The method of claim 1, wherein the bleed flow rate comes from an intermediate stage of the compressor, different from the discharge of the compressor.

* * * * *